(12) United States Patent
Villaire et al.

(10) Patent No.: US 7,845,330 B2
(45) Date of Patent: Dec. 7, 2010

(54) MULTI-PUMP FUEL SYSTEM AND METHOD

(75) Inventors: William L. Villaire, Clarkston, MI (US);
David E. Winn, Birmingham, MI (US);
Robert E. Halsall, Washington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 97 days.

(21) Appl. No.: 12/327,332

(22) Filed: Dec. 3, 2008

(65) Prior Publication Data
US 2010/0132675 A1 Jun. 3, 2010

(51) Int. Cl.
*F02N 7/10* (2006.01)
*F02N 7/00* (2006.01)

(52) U.S. Cl. .................. 123/179.9; 123/509
(58) Field of Classification Search ......... 123/509, 123/179.9, 456, 447, 495, 514, 179.17; 701/103
See application file for complete search history.

(56) References Cited

U.S. PATENT DOCUMENTS 5,664,532 A * 9/1997 August ............... 123/179.11
6,314,947 B1 * 11/2001 Roche ................. 123/525
6,964,267 B2 * 11/2005 Jin .................... 123/514
7,216,614 B2 * 5/2007 Shibata et al. ........ 123/179.17

* cited by examiner

*Primary Examiner*—Mahmoud Gimie
(74) *Attorney, Agent, or Firm*—Ingrassia Fisher & Lorenz, P.C.

(57) ABSTRACT

A vehicular fuel system includes a suction pump having an inlet and an outlet, a priming pump having an inlet and an outlet, a valve and a fluid conduit assembly having a first port coupled to the outlet of the priming pump, a second port coupled to the inlet of the suction pump, and a third port coupled to the valve. The fluid conduit assembly and the valve are configured such that when the priming pump is operated, fluid flows from the outlet of the priming pump, through the first port and second ports, and into the inlet of the suction pump and when the suction pump is operated, fluid flows through the valve and the third and second ports, and into the inlet of the suction pump.

16 Claims, 3 Drawing Sheets

MULTI-PUMP FUEL SYSTEM AND METHOD

TECHNICAL FIELD

The present invention generally relates to fuel systems, and more particularly relates to a vehicular multi-pump fuel system and method.

BACKGROUND OF THE INVENTION

Modern automobiles utilize one or more pumps to transport fuel from the fuel tank to the internal combustion engine. Typically, the fuel system has either a pressure, or push, pump located within the fuel tank (e.g., as in many gasoline-fueled automobiles) or a suction pump located near the engine to provide the fuel (e.g., as in many diesel-fueled automobiles).

A disadvantage of conventional pressure pumps used to transport the fuel from within the fuel tank is that they require additional power to be supplied from the automobile's electrical system. Suction pumps, however, are often powered via mechanically coupling to the internal combustion engine. Nevertheless, suction pumps must often be primed after the internal combustion engine is shut-off and/or runs out of fuel and at times may not provide a desirable amount of fuel to the high pressure pumps that are used to send the fuel to the fuel injectors, thus having a detrimental effect on performance.

Accordingly, it is desirable to provide a fuel system and method of providing fuel to an internal combustion engine in such a way that overcomes the deficiencies in the prior art. Furthermore, other desirable features and characteristics of the present invention will become apparent from the subsequent description taken in conjunction with the accompanying drawings and the foregoing technical field and background.

SUMMARY OF THE INVENTION

A vehicular fuel system is provided. The vehicular fuel system includes a suction pump having an inlet and an outlet, a priming pump having an inlet and an outlet, a valve and a fluid conduit assembly having a first port coupled to the outlet of the priming pump, a second port coupled to the inlet of the suction pump, and a third port coupled to the valve. The fluid conduit assembly and the valve are configured such that when the priming pump is operated, fluid flows from the outlet of the priming pump, through the first port and second ports, and into the inlet of the suction pump and when the suction pump is operated, fluid flows through the valve and the third and second ports, and into the inlet of the suction pump.

An automotive drive system is provided. The automotive drive system includes a combustion engine, a fuel tank, a priming pump having an inlet and an outlet, the inlet being in fluid communication with the fuel tank, a fluid conduit assembly having first, second, and third ports, the first port coupled to the outlet of the priming pump, a valve coupled to the second port of the fluid conduit assembly and in fluid communication with the fuel tank, and a suction pump having an inlet and an outlet, the inlet being coupled to the third port of the fluid conduit assembly and the outlet being coupled to the combustion engine. The fluid conduit assembly and the valve are configured such that when the priming pump is operated, fluid flows from the fuel tank, through the priming pump and the first port and second ports, and into the suction pump and when the suction pump is operated, fluid flows through the valve and the third and second ports, and the suction pump.

A method for providing fuel to a vehicular combustion engine is provided. The fuel is transported from a fuel tank to an inlet of a suction pump with a priming pump. The fuel is transported from the inlet of the suction pump to the combustion engine with the suction pump. The priming pump is disabled. After the disabling of the priming pump, the fuel is transported to the inlet of the suction pump with the suction pump. At least some of the fuel bypasses the priming pump after the priming pump is disabled.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
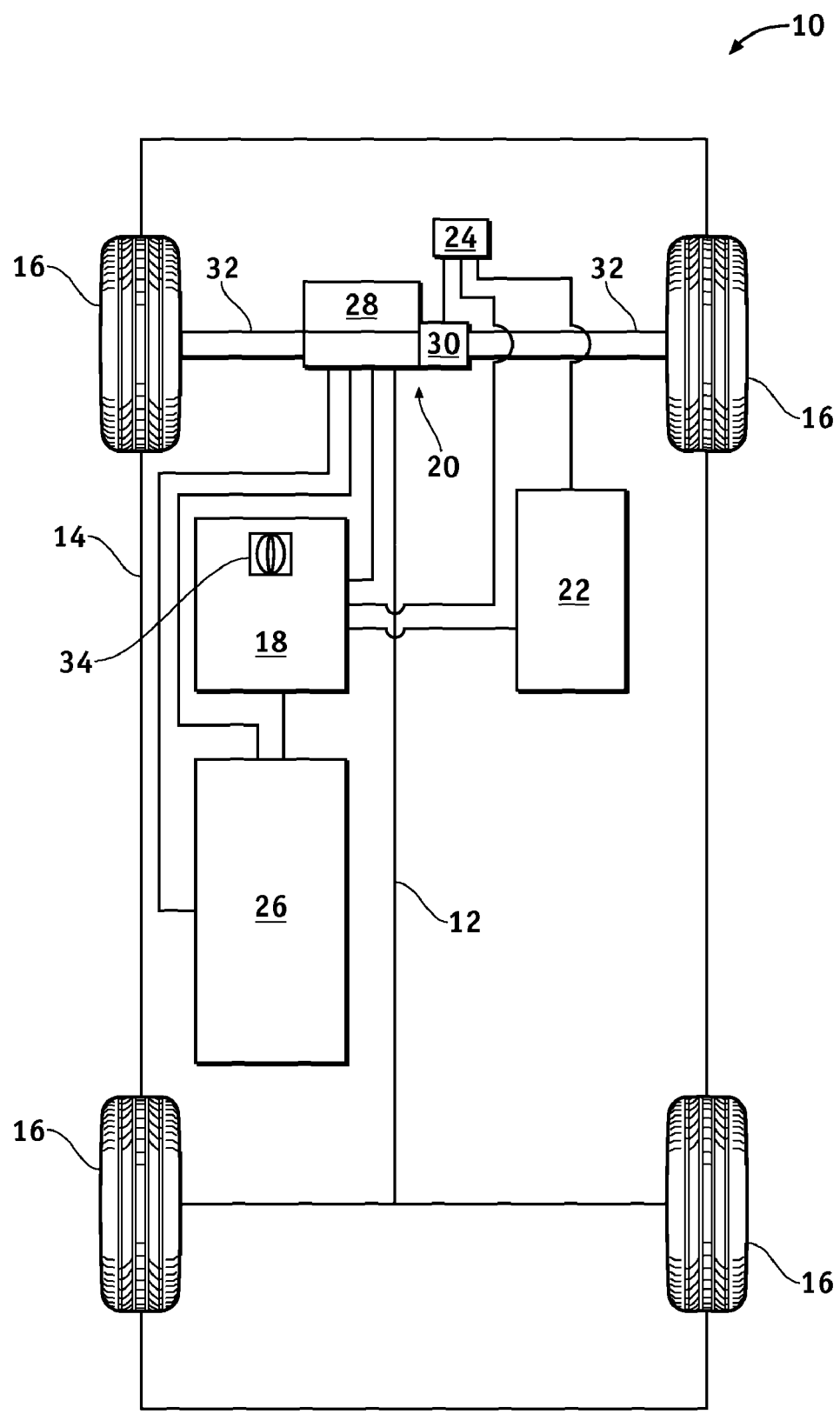
FIG. 1 is a schematic view of an exemplary vehicle according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1 and 2 are merely illustrative and may not be drawn to scale.

FIGS. 1 to FIG. 4 illustrate a vehicular fuel system. The vehicular fuel system includes a suction pump having an inlet and an outlet, a priming pump having an inlet and an outlet, a valve and a fluid conduit assembly having a first port coupled to the outlet of the priming pump, a second port coupled to the inlet of the suction pump, and a third port coupled to the valve. The fluid conduit assembly and the valve are configured such that when the priming pump is operated, fluid flows from the outlet of the priming pump, through the first port and second ports, and into the inlet of the suction pump and when the suction pump is operated, fluid flows through the valve and the third and second ports, and into the inlet of the suction pump.

In one embodiment, the fuel system is installed in an automobile using a diesel-fueled internal combustion engine. The priming pump may be used selectively in combination with the suction pump. For example, both the suction pump and the priming pump may be used for a selected duration when the combustion engine is started. After the duration, only the suction pump may be used. In some embodiments, the priming pump may be reactivated under certain conditions, such as high temperatures or altitudes.

Figure 2:
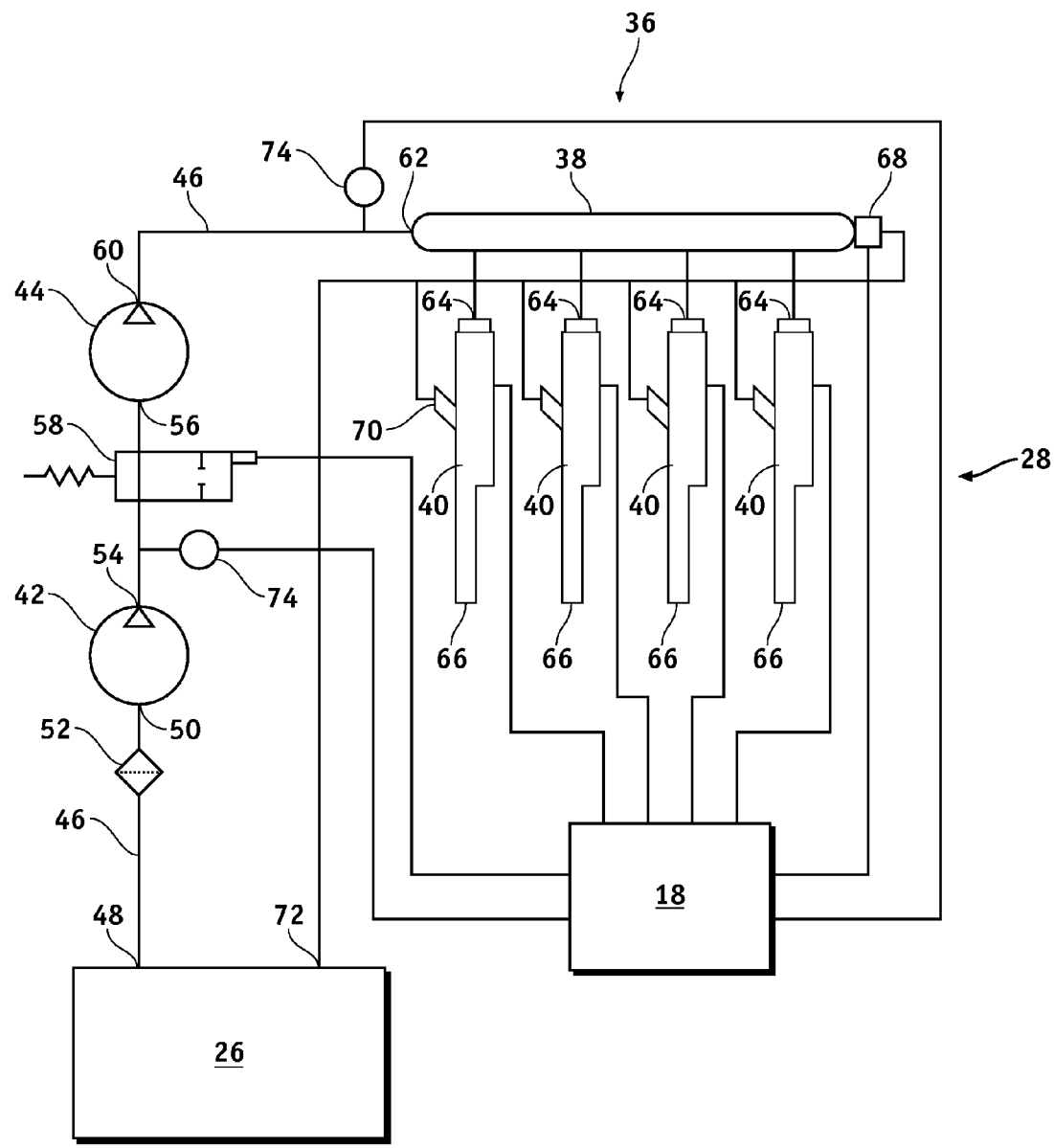
FIG. 2 is a schematic view of a fuel system within the vehicle of FIG. 1.

FIG. 1 illustrates a vehicle (or "automobile") 10, according to one embodiment of the present invention. The vehicle 10 includes a chassis 12, a body 14, four wheels 16 (although other embodiments may have two or three wheels), and an electronic control system 18. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines, such as, for example, a liquid-fueled combustion engine, a gaseous compound (e.g., hydrogen and/or natural gas) fueled engine, a combustion/electric motor hybrid engine, and an electric motor.

Examples of fuels that may be used for combustion engines intended to be included within the scope of this invention include gasoline, diesel, "flex fuel" (i.e., a mixture of gasoline and alcohol), methanol, methyl tetrahydrofuran mixtures, various biodiesels, and liquefied petroleum gas (LPG). It should also be understood that the combustion engines may be either internal combustion engines or external combustion engines (e.g., a Carnot heat engine).

In the exemplary embodiment illustrated in FIG. 1, the vehicle 10 is a hybrid electric vehicle (or hybrid vehicle), and further includes an actuator assembly 20, a battery system (or battery) 22, a power converter assembly (e.g., an inverter assembly) 24, and a fuel tank 26. The actuator assembly 20 includes a diesel internal combustion engine 28 and an electric motor/generator (or motor) 30. However, it should be understood that embodiments of the present invention may be utilized with other types of internal combustion engines (e.g., gasoline-fueled internal combustion engines) in vehicles that do not include an electric motor to drive the wheels.

As will be appreciated by one skilled in the art, the electric motor 30 includes a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 30 may include multiple electromagnetic poles (e.g., sixteen poles), as is commonly understood.

Still referring to FIG. 1, in one embodiment, the combustion engine 28 and the electric motor 30 are integrated such that both are mechanically coupled to at least some of the wheels 16 through one or more drive shafts 32.

Although not shown, the battery system (or direct current (DC) power supply) 22 may include a 12V, lead-acid starter-lighting-ignition (SLI) battery, as well as a high voltage battery suitable for powering the electric motor 30 (e.g., a lithium ion battery).

Although not shown in detail, in one embodiment, the inverter 24 includes a three-phase circuit coupled to the motor 30. More specifically, the inverter 24 includes a switch network having a first input coupled to a voltage source $V_{dc}$ (e.g., the battery 22) and an output coupled to the motor 30. The switch network comprises three pairs (a, b, and c) of series switches with antiparallel diodes (i.e., antiparallel to each switch) corresponding to each of the phases of the motor 30. As is commonly understood, each of the switches may be in the form of individual semiconductor devices such as insulated gate bipolar transistors (IGBTs) within integrated circuits formed on semiconductor (e.g. silicon) substrates (e.g., die).

The electronic control system 18 is in operable communication with the actuator assembly 20, the high voltage battery 22, the inverter assembly 24, and the fuel tank 26. Although not shown in detail, the electronic control system 18 includes various sensors and automotive control modules, or electronic control units (ECUs) or modules (ECMs), such as an inverter control module and a vehicle controller, and at least one processor and/or a memory which includes instructions stored thereon (or in another computer-readable medium) for carrying out the processes and methods as described below. As is commonly understood, the electronic control system 18 and/or the vehicle 10 may include various user input devices, including an ignition switch (or a key lock) 34 for changing the operational state of the vehicle 10 (e.g., "ON" and "OFF"). The operational state of the vehicle 10 may correspond to the operational state of the internal combustion engine 28.

FIG. 2 illustrates a fuel system 36 within the vehicle 10 according to one embodiment of the present invention. The fuel system 36 includes the fuel tank 26, the electronic control system 18 (or a particular ECM therein), components within the internal combustion engine 28 (i.e., a distribution pipe 38 and fuel injectors 40), a low pressure (or first) pump 42, and a high pressure (or second) pump 44. The fuel tank 26, the distribution pipe 38, the injectors 40, and the pumps 42 and 44 are coupled via a set of fluid conduits (or pipes) 46. As will be described in greater detail below, in at least one embodiment, the fuel system 36 also includes a third pump (e.g., a priming pump) within the fuel tank 26.

An outlet 48 of the fuel tank 26 is in fluid communication (i.e., through the fluid conduits 46) with an inlet 50 of the low pressure pump 42, with a fuel filter 52 therebetween. An outlet 54 of the low pressure pump 42 is in fluid communication with an inlet 56 of the high pressure pump 44 with a pressure regulating valve 58 coupled therebetween. An outlet 60 of the high pressure pump 44 is in fluid communication with an inlet 62 of the distribution pipe 38, which is in turn coupled to inlets 64 of the injectors 40. Although not shown as such, outlets 66 of the injectors 40 are in fluid communication with the combustion chambers of the internal combustion engine 28, as is commonly understood. A pressure limiter (i.e., a valve) 68 is also coupled to the distribution pipe 38, as well as drains 70 of the injectors 40 and an inlet (or return port) 72 of the fuel tank 26.

Still referring to FIG. 2, the fuel system 36 also includes various sensors 74 coupled to the fluid conduits 46, as well as other portions of the internal combustion engine 28, to measure, for example, temperatures of various portions of the engine 28, as well as temperatures and pressures of the fuel, the air within the engine 28, and/or the mixture thereof and generate signals representative thereof. As shown, the sensors 74 are in operable communication with the electronic control system 18. One of the sensors 74 may be a manifold absolute pressure (MAP) sensor configured to detect the air pressure inside the intake manifold of the engine 28 (not shown).

Figure 3:
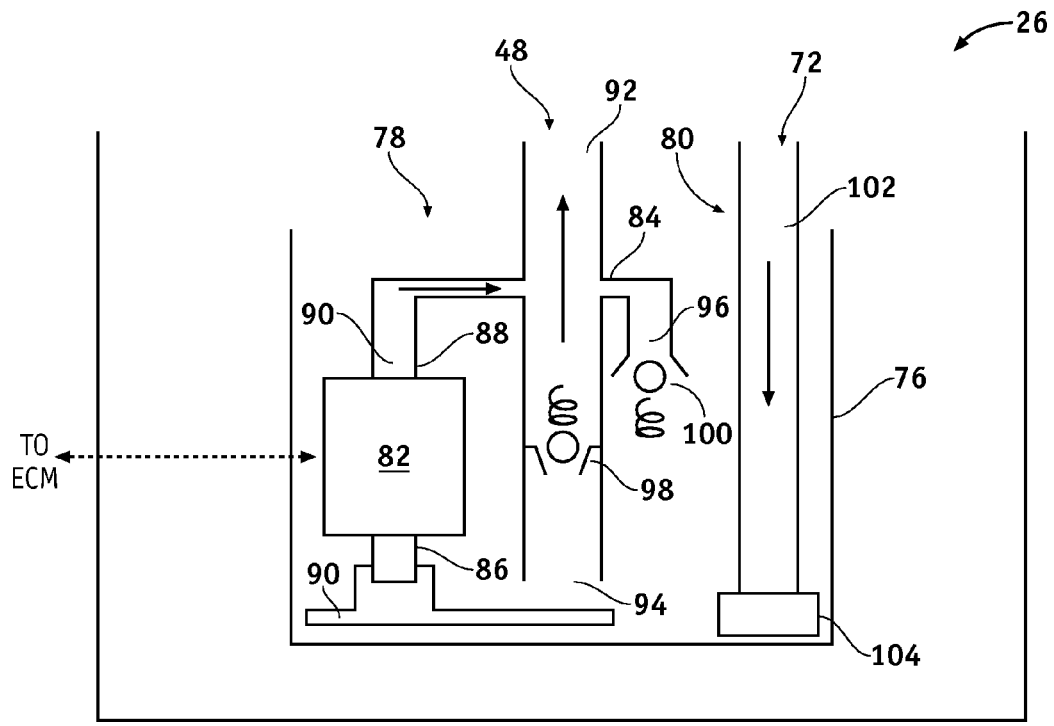
FIG. 3 is a cross-sectional schematic side view of a fuel tank within the fuel system of FIG. 2 according to one embodiment of the present invention.

FIG. 3 illustrates the fuel tank 26 according to one embodiment of the present invention. As shown, the fuel tank 26 includes a reservoir 76 that houses a priming assembly 78 and a return assembly 80. The priming assembly 78 includes a priming pump 82 and a fluid conduit assembly 84. The priming pump 82 is, in one embodiment, a pressure pump, as is commonly understood, with an inlet 86 and an outlet 88 and a strainer (or filter) 90 coupled to the inlet 86. The priming pump 82 is in operable communication with the electronic control system 18 (FIG. 1), or an ECM within the control system 18.

The fluid conduit assembly 84 is formed from a plurality of pipes and includes a first port 90 coupled to the outlet 88 of the priming pump 82, a second port 92 coupled to the outlet 48 of the fuel tank 26 (FIG. 2), and third and fourth ports 94 and 96 within the reservoir 76. The fluid conduit assembly 84 also includes a check valve 98 coupled to the third port 94 and a relief valve 100 coupled to the fourth port 96. The check valve 98 is configured such that substantially no fluid may flow out of the fluid conduit assembly 84 through the third port 94, and the relief valve 100 is configured such that substantially no fluid may flow into the fluid conduit assembly 84 through the fourth port 96. In the depicted embodiment, the check valve 98 and the relief valve 100 are spring assisted ball valves, as are commonly understood.

Still referring to FIG. 3, the return assembly 80 includes a return conduit 102 coupled to the inlet 72 of the fuel tank 26 (FIG. 2) and a jet pump 104 coupled to the return conduit 102.

Figure 4:
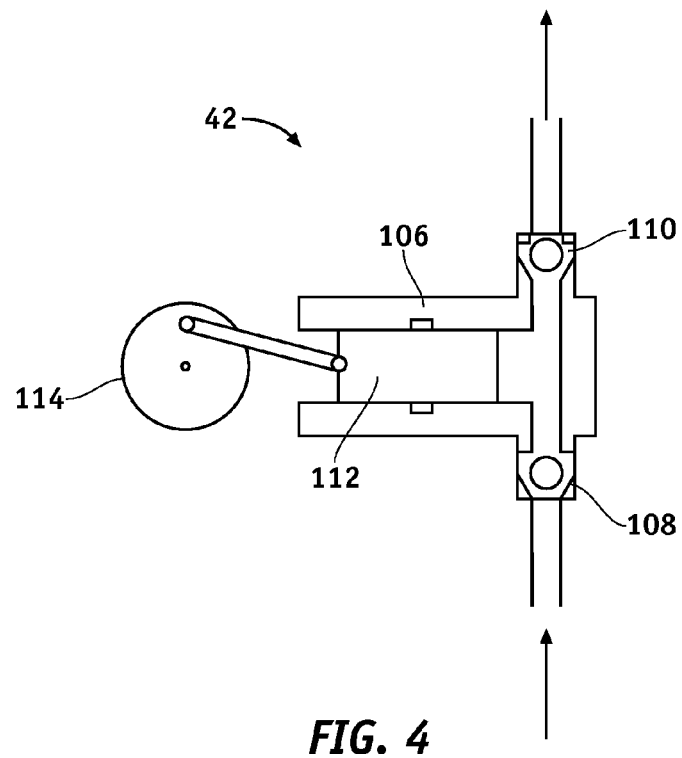
FIG. 4 is a cross-section side view of an exemplary low pressure pump within the fuel system of FIG. 2.

FIG. 4 illustrates the low pressure pump 42 according to one embodiment of the present invention. The low pressure pump 42 is a suction pump, as is commonly understood, and includes a valve body 106 with a passageway extending therethrough, an inlet valve 108, an outlet valve 110, and a piston 112 moveably positioned within the valve body 106. The valves 108 and 110 may be spring assisted ball valves. In the depicted embodiment, the piston 112 is coupled to a cam and/or a crankshaft 114 of the internal combustion engine 28.

During operation, referring to FIG. 1, the vehicle 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30.

Referring to FIGS. 1-4, in one embodiment, when the internal combustion engine 28 is started (e.g., either upon vehicle start-up or in conjunction with the hybrid operation), the priming pump 82 is operated for a predetermined period (e.g., 30 seconds) to ensure that the low pressure pump 42 is provided with sufficient fuel. Referring to FIG. 3, when the priming pump 82 is operated, fuel flows through into the fluid conduit assembly 84 through the first port 90 causing the check valve 98 to close. The fuel then flow through the second port 92 and the outlet 48 of the fuel tank 48. If the pressure within the fluid conduit assembly 84 exceeds a threshold, the relief valve 100 opens, causing at least some of the fuel to flow from the fluid conduit assembly 84 through the fourth port 96.

Referring to FIGS. 2 and 4, the fuel flows through the filter 52 and into the low pressure pump 42, which is operated mechanically by the internal combustion engine 28. The rotation of the cam 114 causes the piston 112 to move within the valve body 106. As the piston 112 is pulled away from the valve body 106, the pressure within the valve body 106 decreases, causing the inlet valve 108 to open, the outlet valve 110 to close, and fuel to flow into the valve body. As the piston 112 is pushed towards the valve body 106, the pressure within the valve body 106 increases, causing the inlet valve 108 to close, the outlet valve 110 to open, and the fuel to flow from valve body 106 through the outlet valve 110.

The fuel flows into the high pressure pump 44, which increases the fluid pressure within the conduits 46 between the high pressure pump 44 and the injectors 40. As is commonly understood, the injectors 40 atomize and/or mix the fuel with air before sending the fuel into the combustion chambers of the internal combustion engine 28.

As is commonly understood, not all of the fuel is used within the injectors 40. The unused fuel is dumped through the drains 70 of the injectors, where is joined with any fuel that is released from the distribution pipe 38 by the pressure limiter (i.e., when the pressure within the distribution pipe exceeds a threshold), and return to the fuel tank 26 though the inlet 72.

Referring again to FIGS. 1 and 3, after the predetermined duration, the priming pump is deactivated, while the internal combustion engine 28 and the low pressure pump 42 continue operation. The low pressure pump 42 creates a suction action within the fluid conduit assembly 84 that causes the check valve 98 to be opened (and the relief valve 100 to be closed) and fuel to flow through the fluid conduit assembly 84 through the third and second ports 94 and 92, respectively, and into the low pressure pump 42. The operation of the fuel system 36 may continue in this way as long as the internal combustion engine remains in operation.

If the internal combustion engine 28 is deactivated, the priming pump 82 may again be operated for the predetermined duration upon re-activation of the internal combustion engine 28.

In one embodiment, the priming pump 82 may be operated or reactivated at other times. For example, if the electronic control system 18 determines that the sensors 74 are detecting particular conditions, the priming pump 82 is operated for as long as the conditions remain. One example is high fuel temperature indicating high temperatures outside. Another example is low air pressure inside the intake manifold, which may be indicative of high altitude.

One advantage is that because the priming pump is operated when the internal combustion engine is started, the likelihood that any air will be fed into the fuel line is reduced, particularly after the vehicle runs out of fuel or undergoes servicing, such as replacing the fuel filter. Another advantage is that because the priming pump may also be operated in selected operating conditions (e.g., high temperature and/or altitude), performance in those circumstances is improved. A further advantage is that because the priming pump is inactivated when it is not needed, the longevity and reliability of the priming pump is improved.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular fuel system comprising:
   a suction pump having an inlet and an outlet;
   a priming pump having an inlet and an outlet;
   a valve;
   a fluid conduit assembly having a first port coupled to the outlet of the priming pump, a second port coupled to the inlet of the suction pump, and a third port coupled to the valve;
   wherein the fluid conduit assembly and the valve are configured such that when the priming pump is operated, fluid flows from the outlet of the priming pump, through the first port and second ports, and into the inlet of the suction pump and when the suction pump is operated, fluid flows through the valve and the third and second ports, and into the inlet of the suction pump; and
   a controller in operable communication with the suction pump and the priming pump, the controller being configured to operate the priming pump when receiving a signal that is representative of a temperature being greater than a predetermined threshold, an air pressure being less than a predetermined threshold, or a combination thereof.

2. The system of claim 1, wherein the fluid conduit assembly and the valve are further configured such that when the priming pump is operated, substantially no fluid flows through the valve.

3. The system of claim 2, further comprising a fuel tank, and wherein the priming pump is located within the fuel tank.

4. The system of claim 3, wherein the fuel tank comprises a reservoir, and wherein the priming pump is located within the reservoir.

5. The system of claim 2, further comprising a second valve, and wherein the fluid conduit assembly further comprises a fourth port coupled to the second valve, the fluid conduit assembly and the second valve being configured such that the fluid flows from the fluid conduit assembly through the fourth port and the second valve when the fluid within the fluid conduit assembly exceeds a predetermined threshold.

6. The system of claim 5, wherein the second valve is configured such that substantially no fluid flows into the fluid conduit assembly through the fourth port.

7. The system of claim 2, wherein the controller is further configured to selectively operate the priming pump during the operation of the suction pump.

8. The system of claim 7, wherein the controller is further configured to operate the priming pump for a predetermined duration upon receiving a signal representative of the starting of a combustion engine.

9. An automotive drive system comprising:
   a combustion engine;
   a fuel tank;
   a priming pump having an inlet and an outlet, the inlet being in fluid communication with the fuel tank;
   a fluid conduit assembly having first, second, and third ports, the first port coupled to the outlet of the priming pump;
   a valve coupled to the second port of the fluid conduit assembly and in fluid communication with the fuel tank;
   a suction pump having an inlet and an outlet, the inlet being coupled to the third port of the fluid conduit assembly and the outlet being coupled to the combustion engine;
   wherein the fluid conduit assembly and the valve are configured such that when the priming pump is operated, fluid flows from the fuel tank, through the priming pump and the first port and second ports, and into the suction pump and when the suction pump is operated, fluid flows through the valve and the third and second ports, and the suction pump;
   a temperature sensor configured to detect a temperature of the combustion engine; and
   a controller in operable communication with the suction pump, the priming pump, and the temperature sensor, the controller being configured to operate the priming pump when receiving a signal that is representative of the temperature of the combustion chamber being greater than a predetermined threshold.

10. The system of claim 9, wherein the fluid conduit assembly and the valve are further configured such that when the priming pump is operated, substantially no fluid flows from the fluid conduit assembly through the valve.

11. The system of claim 10, wherein the suction pump is a low pressure pump and further comprising a high pressure pump having an inlet in fluid communication with the outlet of the suction pump and an outlet in fluid communication with the combustion engine.

12. The system of claim 10, further comprising a controller in operable communication with the suction pump and the priming pump, wherein the controller is configured to operate the priming pump for a predetermined duration upon receiving a signal representative of the starting of the combustion engine.

13. The system of claim 12, wherein the controller is further configured to operate the priming pump in response to receiving a signal that an air pressure is less than a predetermined threshold.

14. A method for providing fuel to a vehicular combustion engine comprising:
   transporting the fuel from a fuel tank to an inlet of a suction pump with a priming pump;
   transporting the fuel from the inlet of the suction pump to the combustion engine with the suction pump;
   disabling the priming pump;
   after the disabling of the priming pump, transporting the fuel to the inlet of the suction pump with the suction pump, wherein at least some of the fuel bypasses the priming pump after the priming pump is disabled; and
   re-activating the priming pump when a temperature of the combustion engine exceeds a predetermined threshold, an air pressure associated with the combustion engine falls below a predetermined level, or a combination thereof.

15. The method of claim 14, wherein the transporting of the fuel with the priming pump at least occurs for a predetermined duration at the starting of the combustion engine.

16. The method of claim 15, wherein the priming pump is located within the fuel tank.

* * * * *